US009373288B2

(12) United States Patent
Huang et al.

(10) Patent No.: US 9,373,288 B2
(45) Date of Patent: Jun. 21, 2016

(54) CONFIGURABLE, LOCALIZED BACKLIGHTING WITH PLANAR EMISSION DEVICES

(71) Applicant: Microsoft Corporation, Redmond, WA (US)

(72) Inventors: Jiandong Huang, Bellevue, WA (US); Steven Nabil Bathiche, Kirkland, WA (US); Ying Zheng, Redmond, WA (US); Linghui Rao, Redmond, WA (US); Kevin Lawrence Woo, Redmond, WA (US); Cynthia Sue Bell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/471,899

(22) Filed: Aug. 28, 2014

(65) Prior Publication Data

US 2016/0063929 A1    Mar. 3, 2016

(51) Int. Cl.
*G09G 3/34* (2006.01)
*G09G 3/36* (2006.01)
*G02F 1/1335* (2006.01)

(52) U.S. Cl.
CPC .............. *G09G 3/3426* (2013.01); *G09G 3/36* (2013.01); *G02F 1/133524* (2013.01); *G09G 2320/062* (2013.01)

(58) Field of Classification Search
CPC .......... G09G 3/3426; G09G 2320/062; G09G 3/3406; G09G 2320/064; G02F 1/133602; G02F 1/133603
See application file for complete search history.

(56) References Cited

U.S. PATENT DOCUMENTS

| 7,719,495 | B2 | 5/2010 | Lee et al. |
| 8,299,985 | B2 | 10/2012 | Shin et al. |
| 8,334,866 | B2 * | 12/2012 | Tan ........................ G09G 3/342 345/102 |
| 2006/0087502 | A1 | 4/2006 | Karidis et al. |
| 2010/0149223 | A1 | 6/2010 | Betts-LaCroix |
| 2011/0279482 | A1 | 11/2011 | Neal |
| 2012/0098870 | A1 | 4/2012 | Barnhoefer et al. |

(Continued)

FOREIGN PATENT DOCUMENTS

CN                 103325355              9/2013

OTHER PUBLICATIONS

Harada et al., "Development of Novel RGBW Mobile Display with Local Dimming Backlight System", SID 2014 Digest, 2014, pp. 1153-1156.

(Continued)

*Primary Examiner* — Abbas Abdulselam
(74) *Attorney, Agent, or Firm* — Brandon Roper; Judy Yee; Micky Minhas (57) ABSTRACT

An electronic device includes a backlight unit and a liquid crystal layer adjacent the backlight unit. The backlight unit has a plurality of planar emission devices distributed over a viewable display area. The plurality of planar emission devices are disposed in a configurable zone arrangement having a plurality of zones of the viewable area. Each zone includes at least one planar emission device. The liquid crystal layer is configured to selectively filter light generated by the plurality of planar emission devices. The electronic device further includes a processor coupled to the backlight unit and configured to control a brightness level of the at least one planar emission device in each zone separately from other planar emission devices in other zones.

19 Claims, 4 Drawing Sheets

(56) References Cited

U.S. PATENT DOCUMENTS

| | | |
|---|---|---|
| 2012/0287182 A1 | 11/2012 | Botzas |
| 2013/0100178 A1 | 4/2013 | Ninan et al. |
| 2013/0293589 A1 | 11/2013 | Hwang |
| 2013/0314454 A1 | 11/2013 | Jin et al. |
| 2014/0043380 A1 | 2/2014 | Ichioka et al. |
| 2014/0092001 A1 | 4/2014 | Kikkawa |

OTHER PUBLICATIONS

Iyer et al., "Energy-Adaptive Display System Designs for Future Mobile Environments", In Proceedings of the First International Conference on Mobile Systems, Applications, and Services, May 5, 2003, 10 pages.

Shu et al, "Optimal Local Dimming for LC Image Formation with Controllable Backlighting", In IEEE Transactions on Image Processing, Jan. 2013, 8 pages, vol. 22, Issue 1.

Tan et al., "Adaptive Display Power Management for OLED Displays", In Proceedings of the first ACM international workshop on Mobile Gaming, Aug. 13, 2012, 7 pages.

International Search Report and Written Opinion Issued in PCT Appliction No. PCT/US2015/046432, Mailed Date: Jan. 8, 2016, 19 Pages.

* cited by examiner

CONFIGURABLE, LOCALIZED BACKLIGHTING WITH PLANAR EMISSION DEVICES

DESCRIPTION OF THE DRAWING FIGURES

For a more complete understanding of the disclosure, reference is made to the following detailed description and accompanying drawing figures, in which like reference numerals may be used to identify like elements in the figures.

While the disclosed systems and methods are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Electronic device displays include backlight units with planar emission devices distributed across a plurality of separately controlled zones or regions. Separate control of the zones may allow the backlight brightness levels to vary across the display. Adjusting a regional or local brightness of the backlight unit is referred to as local dimming. The local dimming may save power, increase contrast, and/or provide other benefits, such as the opportunity to use lower cost liquid crystal display (LCD) components (e.g., with lower contrast ratios). Thermal management may also be improved, as the electrical to optical conversions are distributed across the viewable area of the display. The displays may thus be useful in connection with a wide variety of electronic devices, including but not limited to mobile and other devices in which minimizing power consumption is warranted. Minimizing power consumption may support the implementation of, for instance, highly power efficient, always-on devices. These and other benefits may be provided by the display architectures described herein.

The backlight unit may be disposed in a configurable zone arrangement. A number of aspects of the zone arrangement may be configurable. For instance, the number, size, shape, orientation of the zones may vary. In some examples, the boundaries of the zones may be modified to adjust the number of zones and/or the number of planar emission devices in each zone (the backlight zone granularity or resolution). The zones may be oriented and shaped relative to the pixel array of the display to minimize artifacts of the local dimming. In some cases, diamond-shaped zones are used.

The resolution of the backlight zone arrangement may be adjusted to attain appropriate cost levels for the display, such as the cost of the planar emission devices. Local dimming at a pixel-by-pixel level may be too expensive. The backlight resolution may thus be significantly lower than the display resolution. For example, zone arrangements involving, for instance, a 30 by 30 zone matrix or about 10 to about 30 planar emission device pixels per inch (ppi) may be used. In contrast, the liquid crystal pixel resolution of the display may be one or more orders of magnitude higher. The configurability of the zone arrangement may thus provide local dimming in a manner that addresses a cost-benefit tradeoff. Other cost-benefit tradeoffs may also be addressed. For example, adjusting the number of zones also affects the level of computing resources used to control the zones, including, for instance, processing and memory resources. Multiple neighboring planar emission devices may be grouped into a zone to decrease the demand for computing resources. Coarser zones may thus also address the tradeoff between device cost and performance. An optimized number of zones may be selected for a given electronic device and processing resource environment.

The brightness level of each backlight zone is determined as a function of the tone or brightness of the image to be displayed. Frame data for the image is processed to determine the brightness level of the backlight zone. The frame data for each zone may be processed separately from the frame data for the other zones. Separate processing of the frame data may reduce the computational load presented by the local dimming relative to procedures in which the entire frame is processed (global processing) to determine the individual zone brightness levels.

The planar emission devices may be disposed on a film. In some cases, organic light emitting diode (OLED) films are used. The displays may thus have a suitable thickness for thin form factor devices, such as mobile phones, tablets, and other handheld electronic devices. The displays may thus achieve thicknesses similar to (e.g., thinner than) other mobile device displays in which the light sources of the backlight unit are disposed along an edge of the display.

The displays may be useful with a variety of handheld and other electronic devices. Examples of electronic devices include, but are not limited to, mobile phones, tablets, laptops, computer monitors, televisions, and other computing and non-computing devices having a display. The size and form factor of the electronic device may thus vary. For example, the size of the display may range from the size of a handheld or wearable computing device to the size of a wall-mounted display or other large format display screen. In some cases, the display includes a touch-sensitive surface. The displays may or may not be associated with touchscreens. The electronic devices may or may not be battery powered.

The configurability of the zone arrangement allows a variety of different light source technologies to be used in the backlight unit. Notwithstanding the description herein of displays and electronic devices with OLED devices, other types of planar emission devices may be used as light sources for the displays. The planar emission devices may be or include currently existing light sources, such as OLED devices, light sources under development, such as III-V semiconductor LED technologies and quantum-based light sources, and future developed light sources.

Figure 1:
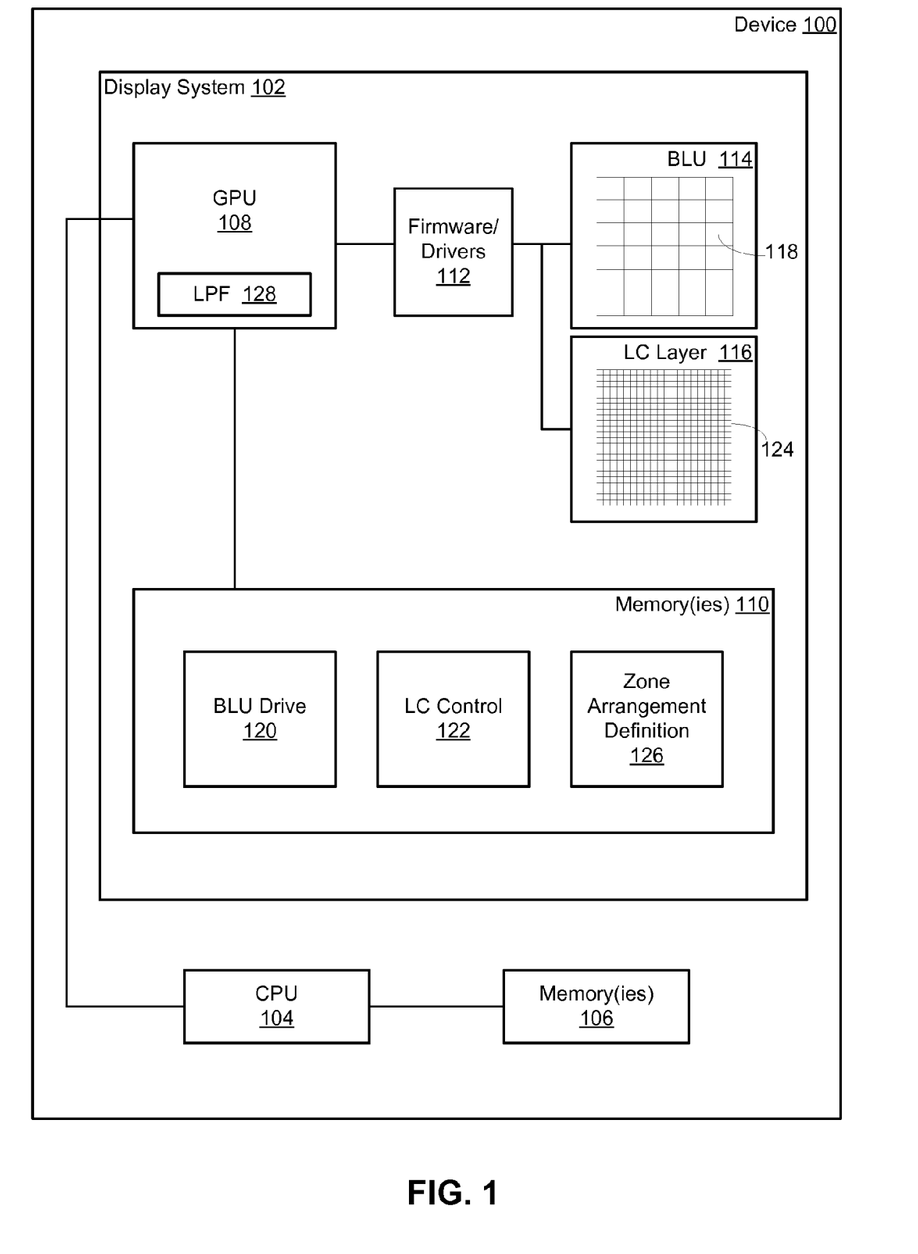
FIG. 1 is a block diagram of an electronic device with a configurable backlight unit for localized backlighting in accordance with one example.

FIG. 1 depicts an electronic device 100 configured for localized backlighting. The device 100 includes a display system 102 (or display module or subsystem). The display system 102 may be integrated with other components of the electronic device 100 to a varying extent. The display system 102 may be or include a graphics subsystem of the electronic device 100. Any number of display systems may be included. In this example, the device 100 also includes a processor 104 and one or more memories 106. The display system 102 generates a user interface for an operating environment (e.g., an application environment) supported by the processor 104 and the memories 106. The processor 104 may be a general-purpose processor, such as a central processing unit (CPU), or any other processor or processing unit. Any number of such processors or processing units may be included.

The display system 102 may be communicatively coupled to the processor 104 and/or the memories 106 to support the display of video or other images via the user interface. In the example of FIG. 1, the processor 104 provides frame data indicative of each image frame of the images to the display system 102. The frame data may be generated by the processor 104 and/or by another component of the device 100. The frame data may be alternatively or additionally obtained by the processor 104 from the memory 106 and/or another component of the device 100.

In the example of FIG. 1, the display system 102 includes a processor 108, one or more memories 110, firmware and/or drivers 112, a backlight unit (BLU) 114, and a liquid crystal layer (LC) layer 116. The processor 108 may be a graphics processing unit (GPU) or other processor or processing unit dedicated to graphics- or display-related functionality. Some of the components of the display system 102 may be integrated. For example, the processor 108, one or more of the memories 110, and/or the firmware 112 may be integrated as a system-on-a-chip (SoC) or application-specific integrated circuit (ASIC). The display system 102 may include additional, fewer, or alternative components. For example, the display system 102 may not include a dedicated processor, and instead rely on the CPU or other processor 104 that supports the remainder of the electronic device 100. The display system 102 may not include the memory (or memories) 110, and instead use the memories 106 to support display-related processing. In some cases, instructions implemented by, and data generated or used by, the processor 108 of the display system 102 may be stored in some combination of the memories 106 and the memories 110.

The backlight unit 114 includes a plurality of planar emission devices distributed over a viewable area of the display system 102. Each planar emission device may be an OLED device, another type of light emitting diode (LED), or another type of light source disposed along the plane of the viewable area (as opposed to along a display edge). Examples and exemplary features of the planar emission devices are described in connection with FIG. 2.

The planar emission devices are arranged in a plurality of zones 118 (or regions). Each zone 118 has at least one planar emission device. In some cases, each zone has multiple planar emission devices. The option to include multiple planar emission devices may provide flexibility in configuring the zone arrangement. Having multiple devices per zone may also provide redundancy and/or allow each constituent planar emission devices to share the brightness level burden and, thus, be driven at a lower intensity. Operation at lower intensities may help avoid performance decay arising from over-driving the devices. In one example, the planar emission devices are distributed across the viewable area in an array having 30 devices per inch, while the backlight unit 114 has only 10 zones per inch. Other device and zone resolutions may be used.

The zones 118 may be arranged in a matrix or array as shown in FIG. 1. In this example, the zones 118 are arranged in a number of contiguous rows and columns. The rows and columns may or may not be oriented along the vertical and horizontal axes of the viewable area. In some cases, the size, shape, and other aspects of the zones 118 may vary across the viewable area. The number of planar emission devices in each zone may vary from zone to zone.

The processor 108 is coupled to the backlight unit 114 to control the brightness level of the planar emission device(s) in each zone 118. In the example of FIG. 1, the processor 108 is coupled to the backlight unit 114 via the firmware and/or drivers 112. One or more drivers may be stored in, and made available via, the firmware 112. In other cases, the processor 108 is directly connected to the backlight unit 114. For example, the backlight unit 114 may include an interface responsive to control signals generated by the processor 108. Alternatively, an interface is provided via the firmware/drivers 112 and/or another component of the display system 102 that is not integrated with the backlight unit 114.

The processor 108 is configured to control the brightness level for each zone. In the example of FIG. 1, the processor 108 is configured in accordance with backlight unit (BLU) drive instructions 120 stored in the memories 110. The BLU drive instructions 120 may direct the processor 108 to control the brightness level of the planar emission devices in each zone separately from other planar emission devices in the other zones 118. When the zone 118 includes multiple planar emission devices, each of the planar emission devices in the respective zone 118 may be driven at a common brightness level. Alternatively or additionally, the multiple planar emission devices may be driven at respective, individual brightness levels that together combine to establish a desired collective brightness level for the zone 118.

The backlight unit 114 may be configured to provide white light. Each planar emission device may thus be configured to emit white light. In other cases, the backlight unit 114 includes color planes (e.g., red, green, and blue addressable color planes) or other arrangements of color light sources. In such cases, the brightness of each color in a respective zone may be controlled separately from the other colors in the respective zone (in addition to being controlled separately from the emission devices in the other zones). The respective brightness levels of the colors may again be determined as a function of the image to be displayed. In some cases, the brightness of each backlight emission device may depend, in turn, on the intensities of the respective colors present in the image to be displayed. With the capability to address each color plane (or other color emission device) individually, further power savings may be achieved.

The liquid crystal layer 116 is disposed adjacent the backlight unit 114. In some cases, the backlight unit 114 and the liquid crystal layer 116 are contiguous with each other. Alternatively, one or more transparent layers are disposed between the backlight unit 114 and the liquid crystal layer 116. For example, an adhesive film may be disposed between the backlight unit 114 and the liquid crystal layer 116. The light sources of the backlight unit 114 may be configured and arranged such that the backlighting is sufficiently spreadable across the viewable area without a diffuser or other light spreader between the backlight unit 114 and the liquid crystal layer 116. A diffusing or other layer or element may nonetheless be disposed between the backlight unit 114 and the liquid crystal layer 116 in some cases.

The liquid crystal layer 116 is configured to selectively filter light generated by the plurality of planar emission devices. The liquid crystal layer 116 defines an array 124 of pixels addressable by the processor 108. As shown in FIG. 1, the number of pixels in the array 124 may vastly outnumber the resolution of the zone arrangement. The respective resolutions of the pixel array 124 and zone arrangement shown in FIG. 1 are merely exemplary and provided for ease in illustration. For example, the pixel array 124 may have a resolution one, two, or more orders of magnitude higher than the resolution of the zone arrangement. The resolution of the liquid crystal layer 116 and the backlight unit 114 may thus significantly differ from display arrangements in which a respective light source is provided for each pixel, which may be prohibitively expensive. In this example, the pixel array 124 is oriented along the same dimensions or axes as the zones 118. In other cases, different dimensions or axes are used, several examples of which are described below in connection with FIG. 3.

The processor 108 individually controls each pixel to determine the extent to which light from the planar emission device(s) passes through the liquid crystal layer 116. In this example, the processor 108 is configured to control the liquid crystal layer 116 in accordance with liquid crystal (LC) control instructions 122. The processor 108 may be configured to adjust the image tone levels for the pixel array 124 of the liquid crystal layer 116 to coordinate the filtering of the light with the brightness levels of the planar emission devices. For example, the amount of filtering may be adjusted along a boundary between adjacent zones 118 with different brightness levels. If the pixels on either side of the boundary are intended to have similar image tone levels, the pixels in the zone 118 with the brighter backlighting are directed to filter more light relative to the pixels in the other zone 118 with the dimmer backlighting. The filtering of a respective pixel of the liquid crystal layer 116 may thus be controlled in a manner that takes into account the brightness level of the planar emission device(s) of the zone 118 in which the pixel is disposed. The brightness level of the backlight unit 114 and the amount of filtering are thus two controllable variables that combine to achieve a desired tone or brightness for each pixel.

The arrangement of zones 118 may be configurable. In some cases, the configurability of the zone arrangement may be relative to the pixel array 124. For example, the zone arrangement may be configurable to dispose a specified number of pixels in each zone 118. Alternatively or additionally, the zone arrangement may be configurable to specify the number of planar emission devices in each zone 118. The boundaries of the zones 118 may thus be configurable. The configurability of the zone arrangement may specify the shape, size, orientation, position, and/or other parameters of the zones 118. The total number of zones 118 may also be configurable.

Data indicative of a specification or other definition 126 of the zone arrangement may be stored in the memories 110. The processor 108 may then access the memory 110 to obtain the data of the definition 126 in connection with determining the respective brightness level of each planar emission device. For example, the processor 108 may use the data to determine the locations of the zones 118, to identify the planar emission device(s) associated with each zone 118, and/or to determine whether any planar emission devices are to be driven at a common level due to, for instance, being disposed in a common zone.

The processor 108 processes the frame data to determine the brightness level of the planar emission devices disposed in the backlight zone arrangement. In some cases, the frame data for each zone 118 is processed separately from the frame data for other zones 118. The brightness level may thus be determined for each respective zone without having to process the frame data for the entire viewable area of the display system 102. Instead, the brightness level for each zone 118 is based on frame data local to the respective zone 118, rather than global frame data for the entire viewable area.

The local frame data may be sufficient for determining the brightness level for each zone 118 because the backlight unit 114 may be configured in a manner that minimizes light spreading between zones 118. For example, the planar nature, or thin form factor, of the light sources of the backlight unit 114 may lead to zero, little, or limited light spreading. In some cases, light spreading may also be limited by the configuration of the display system 102, such as the lamination or other bonding of the backlight unit 114 and the liquid crystal layer 116. These aspects of the display architecture are in contrast to other systems in which a diffuser is used to spread point-like LED sources to an extent that light overlaps or mixes between zones. As a result of such spreading, overlapping, and mixing, the entire dataset for an image frame may be used to determine respective brightness levels of the LED devices. Processing the entire image frame may involve considerably more memory, processing power, and other resources, relative to the zone-by-zone frame data processing of the display system 102.

In some cases, the local frame data is processed by the processor 108 to determine a zone brightness level that is then subject to further processing before use in driving the backlight unit 120. In the example of FIG. 1, the processor 108 includes a low pass filter (LPF) 128. The low pass filter 128 may be used to smooth the brightness levels of nearby zones 118. In one example, the zones 118 within a certain matrix (e.g., a 15 by 15 zone matrix) are smoothed. In other examples, the matrix may be smaller such that, for instance, only adjacent or neighboring zones 118 are smoothed. As a result of the smoothing, differences between the brightness levels in adjacent zones 118 may be limited to a predetermined amount. Artifacts or irregularities in the resulting displayed images may thus be avoided or reduced. In such cases, the frame data for each zone 118 is still processed separately from other frame data to determine a preliminary brightness level for the respective zone 118. The preliminary brightness levels are then processed by the low pass filter 128 to determine final brightness levels for each zone 118. Alternatively or additionally, the brightness levels provided from the low pass filtering operation are normalized to the peak intensity across the viewable area. The low pass filter 128 may be implemented in hardware, software, firmware, or a combination thereof.

The BLU drive instructions 120, the LC control instructions 122, and the zone arrangement definition 126 may be arranged in discrete software modules or instruction sets in the memories 110. Alternatively, two or more of the instructions or definitions 120, 122, 126 may be integrated to any desired extent. The instructions or definitions 120, 122, 126 may alternatively or additionally be integrated with other instructions, definitions, or specifications stored in the memories 110. Additional instructions, modules, or instruction sets may be included. For instance, one or more instruction sets may be included for processing touch inputs in cases in which the display system 102 includes a touchscreen or other touch-sensitive surface.

In some cases, display defect data is stored in the memories 110. The display defect data may be indicative of a defect in the backlight unit 114 or the liquid crystal layer 116, or other layer or component of the display system 102. Left uncompensated, the defect may result in a dimmer region of the viewable area. The defect data may be used by the processor 108 to adjust the backlight level for one or more of the zones 118. The defect data may be taken into account when determining the brightness levels of the zones 118. The adjusted backlight level may compensate for the defect by increasing the brightness of one or more of the zones 118 to a level higher than otherwise warranted (e.g., by the frame data to be displayed).

The processing of the frame data and other aspects of the localized backlighting techniques may be implemented by any combination of the processor 104, the processor 108, and/or one or more other processor(s), which may be collectively referred to as a processor. In other examples, the device 100 includes a single processor (i.e., either the processor 104, the processor 108, or a different processor) for purposes of obtaining and processing the frame data.

Figure 2:
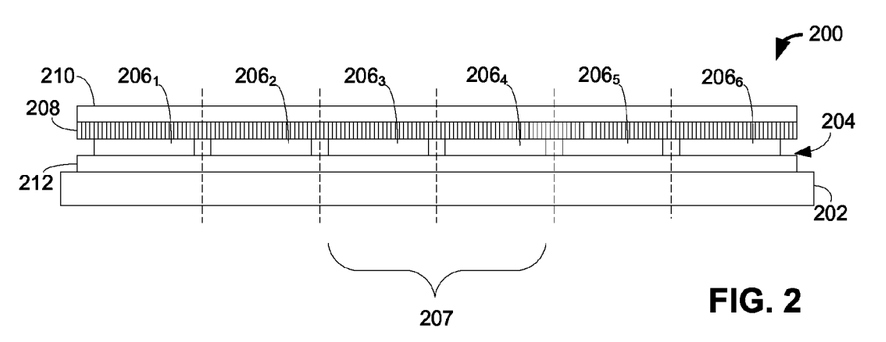
FIG. 2 is a partial, schematic, cross-sectional view of a display assembly in accordance with one example.

FIG. 2 depicts a partial, sectional view of a display assembly 200. The display assembly 200 may be part of the display system 102 (FIG. 1) or otherwise incorporated into an electronic device. The display assembly 200 includes a plate 202 and a number of films, layers, or devices arranged in a stack supported by the plate 202. In this example, the stack includes a backlight unit 204 having a plurality of planar emission devices 206, a liquid crystal layer 208, and cover glass 210. In the partial view of FIG. 2, six planar emission devices $206_{1-6}$ are depicted. Dashed lines separating the planar emission devices 206 may be indicative of zone boundaries of the backlight unit 204. Alternatively, each zone includes two adjacent planar emission devices 206. For example, the planar emission devices 2063 and 2064 may be disposed within a respective multiple-device zone 207. In some cases, each of the planar emission devices 2063 and 2064 are then driven at a common brightness level.

The plate 202 may be configured to provide structural support for the stack. The plate 202 may be rigid or flexible. In some cases, the plate 202 is configured as, or includes, a back cover of the electronic device. The plate 202 may have a lightweight construction that nonetheless protects the layers of the stack. For example, the plate 202 may be composed of carbon fiber, aluminum, or a plastic material. The composition of the plate 202 may vary. Other characteristics of the plate 202 may also vary, including, for instance, the thickness, construction (e.g., one-piece or composite), and lateral extent or coverage.

The planar emission devices 206 are disposed in a plane in parallel with the other layers of the stack. For example, the plane in which each planar emission device 206 is disposed runs in parallel with the plane of the liquid crystal layer 208. In the example of FIG. 2, the backlight unit 204 includes a planar substrate 212 on which the planar emission devices 206 are supported, disposed, or otherwise carried. The substrate 212 may be rigid or flexible. In some cases, the substrate 212 is a film on which the planar emission devices 206 are carried. The substrate 212 and the planar emission devices 206 may thus be collectively considered a backlight film. Examples of film-like substrates include glass or plastic substrates. OLED devices, micron-sized inorganic LED devices, or hybrid OLED-inorganic LED devices may be fabricated on, bonded to, or otherwise secured to, the glass or plastic substrates. These and other devices may be grouped or otherwise arranged to form larger (e.g., greater than 1 micron) planar emitting surfaces. Other substrate materials and substrate types may be used.

In some cases, the planar emission devices 206 are released from a substrate during fabrication or assembly. The stack may thus not include the substrate 212 in some cases. The planar emission devices 206 may then be bonded or otherwise secured to another substrate or layer. For example, the planar emission devices 206 may be secured to the liquid crystal layer 208 or the plate 202.

The components of the backlight unit 204 are planar or flat structures. In the example of FIG. 2, the substrate 212 and the planar emission devices 206 thereof are planar or flat structures. A planar or flat structure is one in which the thickness, or height, dimension is significantly lower than the two lateral dimensions. The planar emission devices 206 are depicted schematically in FIG. 2, and may have non-active structures (e.g., passivation layers) between adjacent devices.

With a thin backlight unit 204, the display assembly 200 may be useful in connection with handheld, portable, or other electronic devices. The backlight unit 204 may be considered thin if the backlight unit 204 has a thickness on the order of (or similar to) the thickness of one or more other layers of the stack. For example, the backlight unit 204 may be thin in cases in which the thicknesses of the backlight unit 204 and the liquid crystal layer 208 are similar (e.g., within 50% of each other). For example, the backlight unit 204 may have a thickness that falls within a range from about 1 micron to about a few thousand microns. Notwithstanding the foregoing, the dimensions of each planar emission device 206 may vary.

Each planar emission device 206 is a light emitting diode or other light source device, such as an OLED device. The OLED devices may be disposed in, or configured as, a film. The configuration, construction, materials, and other aspects of the light emitting devices 206 may vary. For instance, emission technologies other than OLED technologies may be used for the light emitting devices 206. For example, III-V semiconductor-based LED structures may be used to fabricate micron-sized LED devices. The small thickness of such structures allows the devices 206 to be disposed in planar arrangements (e.g., on or in planar surfaces) and thus, distributed across the viewable area of the display. Non-LED technologies, such as finely tuned quantum dot-based emission structures, may also be used. Other thin form factor emission technologies, whether developed, in development, or future developed, may be used.

The liquid crystal layer 208 may be configured in a passive matrix or an active matrix. Active matrix configurations may be used because the peak intensity of the backlight unit zones may be high. With a driver for each pixel (e.g., each zone), active matrix configurations may have a duty cycle at nearly 100%, so average brightness levels may not involve very high peak intensities.

Passive matrix configurations may also be used. With a passive matrix, the pixel(s) of each zone may not be activated simultaneously, but rather, for example, individually. So each pixel (e.g., each zone) may utilize only a fraction of the time slot for each image frame. The peak intensity of each zone may accordingly take into account the duty cycle of each zone. In other cases, a line scan scheme is used. The duty cycle may increase to the fraction corresponding to the numbers of rows (or columns) in the matrix, thereby lowering the maximum intensity warranted for each zone pixel. Relative to these passive matrix schemes, an active matrix may significantly lower the peak intensity demand for each zone.

The liquid crystal layer 208 may be or include a stack of constituent layers. For example, constituent layers in addition to the constituent layer having the liquid crystal may be included for electrodes, polarization, and/or other purposes. Various cell designs may be used for the liquid crystal layer 208, including, for instance, twisted nematic (TN), in-plane switching (IPS), super IPS (S-IPS), and other designs. Different material systems may be used in the drive circuitry, such as amorphous silicon, poly-silicon, metal oxides, or other semiconductor materials. The configuration, construction, and other characteristics of the liquid crystal layer 208 may vary in other ways.

The composition of the cover glass 210 may vary. For example, the cover glass 210 may be configured as a uniform glass block or a composite glass block having multiple, different glasses. In still other cases, the cover glass 210 may be replaced with a transparent plastic cover.

The layers of the display assembly stack may be laminated or bonded to one another. For example, the backlight unit film 204 may be bonded to the support plate 202. Alternatively or additionally, the backlight unit film 204 may be bonded to the liquid crystal layer 208. Various adhesive materials, such as index matching, transparent epoxy materials, may be used to bond the layers of the stack to one another. In some cases, the liquid crystal layer 208 may be used as a substrate or other support structure to support the backlight unit film 204.

The layers of the stack may be secured to one another in other ways. For example, the stack layers may be clamped.

Additional, fewer, or alternative films, layers, or devices may be provided. For example, one or more additional optical or structural layers may be included in the stack. Alternatively or additionally, other components of the electronic device may be disposed in or adjacent to the stack, such as circuit, battery, and/or other components.

The layers of the stack are depicted with similar thicknesses for ease in illustration. The relative thicknesses and other dimensions of the layers of the stack may differ widely from the examples shown.

Figure 3:
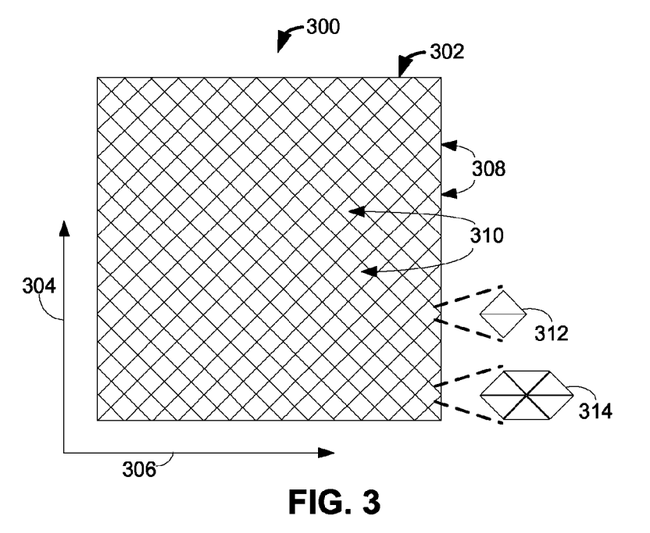
FIG. 3 is a schematic view of an arrangement of a plurality of zones of a backlight unit in accordance with one example.

FIG. 3 depicts a zone arrangement 300 in accordance with several examples. The zone arrangement 300 covers an entire viewable area 302 of a display. In this case, the viewable area 302 is a square-shaped area. The viewable area 302 has an array of liquid crystal pixels. The liquid crystal pixels are not shown for ease in illustration of the zone arrangement 300. In one example, the pixel resolution of the display is 600×600. The viewable area 302 thus includes liquid crystal pixels in 600 columns and 600 rows.

The liquid crystal array has an orientation relative to the viewable area 302. In this example, the array is disposed in columns oriented along a vertical axis 304 and in rows oriented along a horizontal axis 306. Other orientations may be used for the liquid crystal array.

The zone arrangement 300 may be oriented differently than the orientation of the display pixels to minimize boundary conditions. In this example, the zone arrangement 300 is oriented in a manner other than the horizontal-vertical orientation of the display pixels. For instance, the zone arrangement 300 may have boundaries oriented diagonally. Several examples with diagonal boundaries are shown in FIG. 3.

In one example, the zone arrangement includes a number of zones 308, 310. The zones 308, 310 are not oriented along the rows and columns of the viewable area 302. In this example, each of the boundaries of the zones 308, 310 is disposed along diagonal lines. The boundary lines are diagonally oriented relative to the axes 304, 306 of the liquid crystal array. The intersections of the boundary lines define a number of diamond-shaped zones 310 within interior areas of the viewable area 302. The zones 310 are diamond-shaped relative to the orientation of the liquid pixel array (e.g., the axes 304, 306). Along the outer border of the viewable area 302, the zones 308 may be triangular rather than diamond-shaped.

The diamond shape of the zones 310 may help prevent or reduce artifacts of the localized backlighting control. For example, artifacts may prevented or reduced due to the tendency of a viewer of the display to focus on objects oriented along the axes 304, 306, rather than along diagonal lines.

Other shapes may be used in addition or alternative to the diamond-shaped zones 310. The shapes may be non-rectilinear shapes despite the rectilinear shape of the viewable area 302. For example, the zone arrangement may include hexagonally shaped zones.

In other cases, not all of the zone boundaries are oriented diagonally. Two examples of alternative zone shapes are shown in FIG. 3. In one example, each zone 312 is a triangular zone. Two of the zones 312 may cover the area of one of the diamond-shaped zones 310. In another example, the area of one of the diamond-shaped zones 310 is divided into six triangular-shaped zones 314. The zones 314 may be arranged in a hexagonal pattern as shown. The right-angle corner of the triangular-shaped zones 312, 314 may be convenient for disposing the light emitting device(s) within the zone 312, 314. The number and pattern of the zone arrangement may vary from the examples shown.

Figure 4:
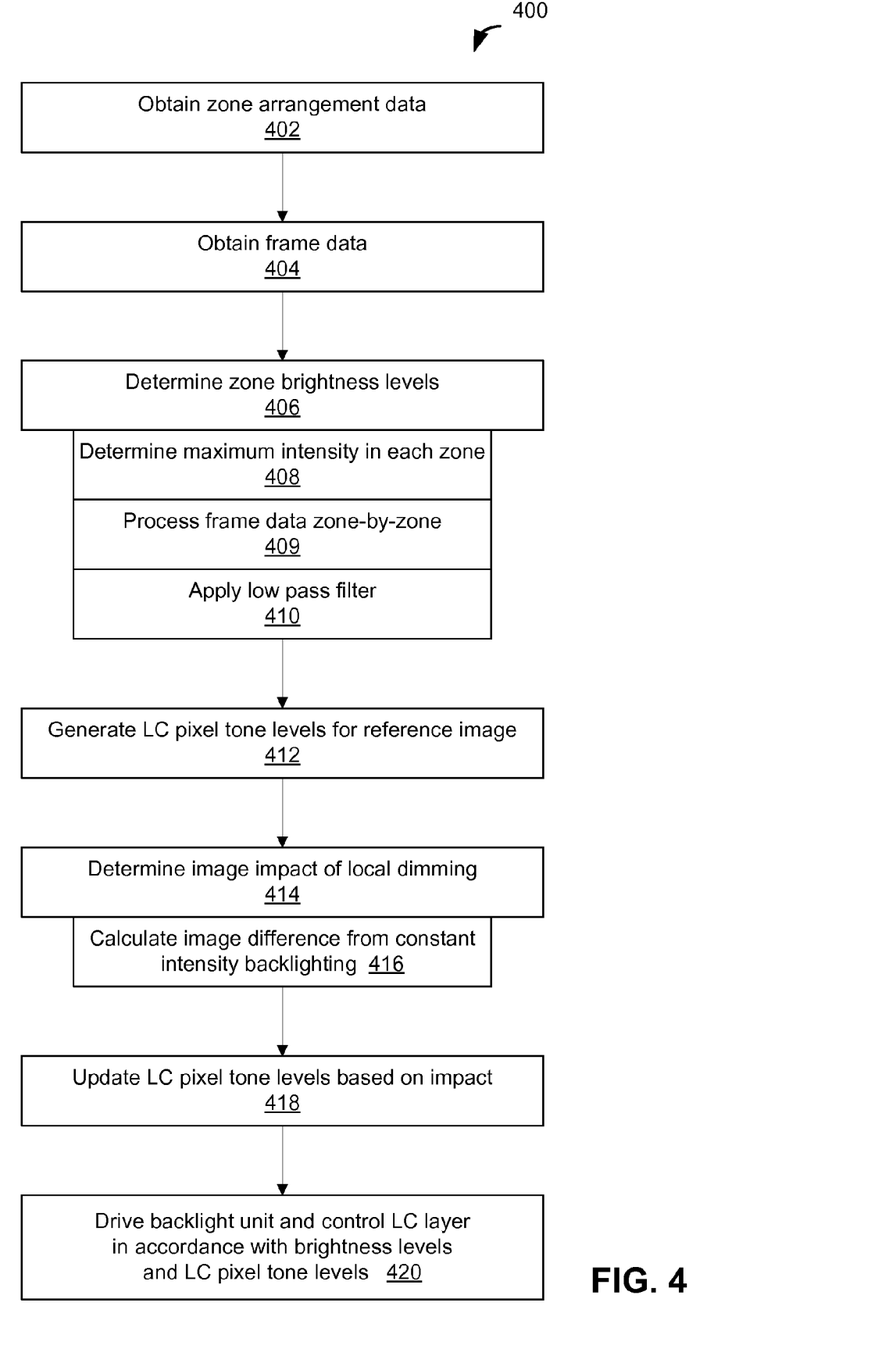
FIG. 4 a flow diagram of a computer-implemented method of operating an electronic device having a display with a configurable backlight unit for localized backlighting in accordance with one example.

FIG. 4 depicts an exemplary method 400 for localized backlighting with planar emission devices. The localized backlighting may be configurable. The method 400 is computer-implemented. For example, one or more computers of the electronic device 100 shown in FIG. 1 and/or another electronic device may be configured to implement the method or a portion thereof. The implementation of each act may be directed by respective computer-readable instructions executed by the processor 108 (FIG. 1) of the display system 102 (FIG. 1), the processor 104 (FIG. 1) of the device 100, and/or another processor or processing system. Additional, fewer, or alternative acts may be included in the method 400. For example, the method 400 may not include iteration of acts directed to determining backlight brightness levels and liquid crystal tone levels. Alternatively, the method may include additional iterations of such acts.

The method 400 may begin with one or more acts related to obtaining data indicative of the zone arrangement of the display. The data may be indicative of the number, size, location, and other characteristics of the zones. In one example, the zone arrangement data is indicative of the zone to which each planar emission device (e.g., OLED device) belongs. Groups of planar emission devices to be commonly controlled may thus be specified. In some cases, the zone arrangement data may be specified by a matrix of planar emission devices. For example, the planar emission devices may be disposed in rows and columns that may be used as indices in specifying the zones. The zone arrangement data may be configured in alternative ways and/or include additional information. For example, the zone arrangement data may be specified via liquid crystal pixel location data.

The zone arrangement data may be obtained by accessing one or more memories. For example, the memories 110 (FIG. 1) may be accessed. Alternatively or additionally, the zone arrangement data may be obtained from the firmware 112 (FIG. 1).

The zone arrangement data may be obtained at an initial operational time. For example, the processor 108 (FIG. 1) may receive or otherwise obtain the zone arrangement data during a startup sequence implemented upon awakening or activation of the electronic device. The zone arrangement data may be obtained at other times. For example, in some cases, the zone arrangement data is obtained at a later point in time, such as during, or as a part of, one or more acts in which the zone arrangement data is applied (e.g., during backlight unit control).

In act 404, frame data to be displayed is obtained. The frame data may be provided by the processor 104 (FIG. 1). Alternatively, one or more of the memories described in connection with FIG. 1 may be accessed to obtain the frame data, such as the memories 106, and/or another memory. The frame data may include data specifying desired tone levels on a pixel-by-pixel basis for the display.

The frame data is then processed in act 406 to determine a backlight brightness level for each zone. In some cases, the act 406 includes determining the maximum pixel brightness for the display pixels correlated to each zone. The backlight brightness level for the respective zone may then be determined as a function of the maximum pixel brightness. The function may vary. For example, in white backlight cases, the backlight brightness level may be proportional to the maximum pixel intensity. Other cases may involve more complex functions. For example, the zone brightness may be set to levels according to the average brightness of the display pixels correlated to the respective zone. Other factors may be used to determine brightness levels, including, for instance, image quality enhancement and/or display power consumption reduction.

The act 406 may be configured such that the brightness level for each zone is determined based on the frame data local to the respective zone, as shown in act 409. The frame data may thus be processed zone-by-zone. Processing only the local frame data for a respective zone may be useful in cases in which more complex functions are used to determine the brightness level. Alternatively, the frame data is globally processed to determine the zone brightness levels.

In some cases, the zone brightness levels resulting from the function are then applied to a low pass filter in act 410. The low pass filter may be configured to smooth brightness variations between neighboring zones. The low pass filter may thus be directed to avoid halo and other artifacts or adverse effects of the local dimming.

The low pass filter may be applied regardless of whether the zone brightness levels involve local or global frame data. However, the low pass filter may provide one way in which non-local frame data is taken into account without unduly slowing down the procedure used to determine the zone brightness levels initially.

Once the backlight zone brightness levels are determined, liquid crystal (LC) pixel tone levels may be generated in act 412. The pixel tone levels are generated based on the backlight zone brightness levels and the frame data. Tone levels (e.g., red, green, and blue tone levels) are generated for each pixel in a zone once the backlight brightness level for the respective zone is known.

In the embodiment of FIG. 3, the tone levels generated in act 412 are for a reference, or preliminary, frame. The reference frame may be used in an iterative procedure configured to determine an optimal set of pixel tone levels. The reference frame and the iterative procedure may be directed to correcting for halo and other adverse effects of the local dimming.

The generation of the reference frame in act 412 may be considered a pre-compensation stage of the method 400. The pre-compensation stage may consume minimal computing resources and, thus, power, because only local frame data is used to determine the zone brightness levels and, in turn, the tone levels of the reference frame. Global optimizations may thus be avoided. Moreover, the computing load is scaled inversely to the number of backlight zones.

The iterative procedure may be based on a determination in act 414 of the impact on the resulting image of the local dimming. For instance, the act 414 may include the calculation in act 416 of the difference between the image resulting from the local dimming and the image resulting from constant (e.g., high) intensity backlighting to estimate the amount of image distortion. Knowing the extent of the difference may allow the process to compensate for, and thus, avoid, the image distortion. New pixel tone levels may then be generated in act 418 based on the impact or difference in the resulting images.

In some cases, a pre-compensation factor is applied to the difference between the images. For example, the factor may be applied as a multiplier to the difference between the images on a pixel-by-pixel basis. As a result, factors over 1.0 (e.g., 1.2) may provide over-compensation for faster convergence. The pre-compensation factor may be used to adjust the tradeoff between image quality and processing time.

The manner in which the tone levels are generated from the brightness levels may vary, as described hereinabove.

One or more additional iterations of the generation of image tone levels may be implemented. For example, the acts 412-418 may be repeated during each iteration. The method 400 of FIG. 4 provides first order pre-compensation. Second order or further pre-compensation may improve the quality of the resulting image. The second and higher orders may use the calculated results of the previous iteration as the input. The image tone level calculations may be repeated until a satisfactory level of image quality is attained. The number of iterations may be limited or reduced (e.g., via the pre-compensation factor) to minimize or reduce the computational load.

The above-described pre-compensation technique and iterative procedure may be applied in the context of color backlight units. A pre-compensation or reference frame may be separately generated for each color plane (e.g., red, green, and blue).

Once the iteration is complete or satisfactory image tone levels are otherwise generated, the images may be provided on the display in act 420. The act 420 may include a number of procedures, including, for instance, driving the emitters of the backlight unit at the updated (or otherwise determined) brightness levels for each zone and sending control signals to the liquid crystal layer in accordance with the pixel tone levels.

The order of the acts of the method may vary from the example shown. For example, in some cases, the acts are implemented in parallel or concurrently while processing the frame data of different frames.

The above-described devices provide local dimming with planar emission devices. The local dimming is provided in coordination with image tone adjustments to reduce or eliminate halo effects and/or other artifacts of the local dimming. The planar emission devices may be configured to satisfy form factor considerations of mobile and other electronic devices. For instance, the backlight units of the devices may have thicknesses similar to or better than displays with edge-coupled light-emitting diodes.

The local dimming is optimized by configuring a zone arrangement of the planar emission devices. The zone arrangement may be coarser than the pixel array of the display, which may make implementation of the backlight unit cost effective. The shapes, sizes, spacing, and other aspects of the zones may be varied to optimize one or more power savings-cost tradeoffs. The costs to be considered may include both manufacturing or component costs and processing/resource costs. In one example, power savings of 94% may be achieved with a backlight unit having a zone arrangement having a matrix of 30 by 30 zones. Eventually, the power savings may become saturated, as the number of zones increases. The number of zones may also increase resource costs. Thus, even if the manufacturing or component costs are low enough to allow additional planar emission devices, the planar emission devices may nonetheless be grouped into multiple-device zones to reduce or minimize the processing and/or memory resources involved in supporting the local dimming technique.

Figure 5:
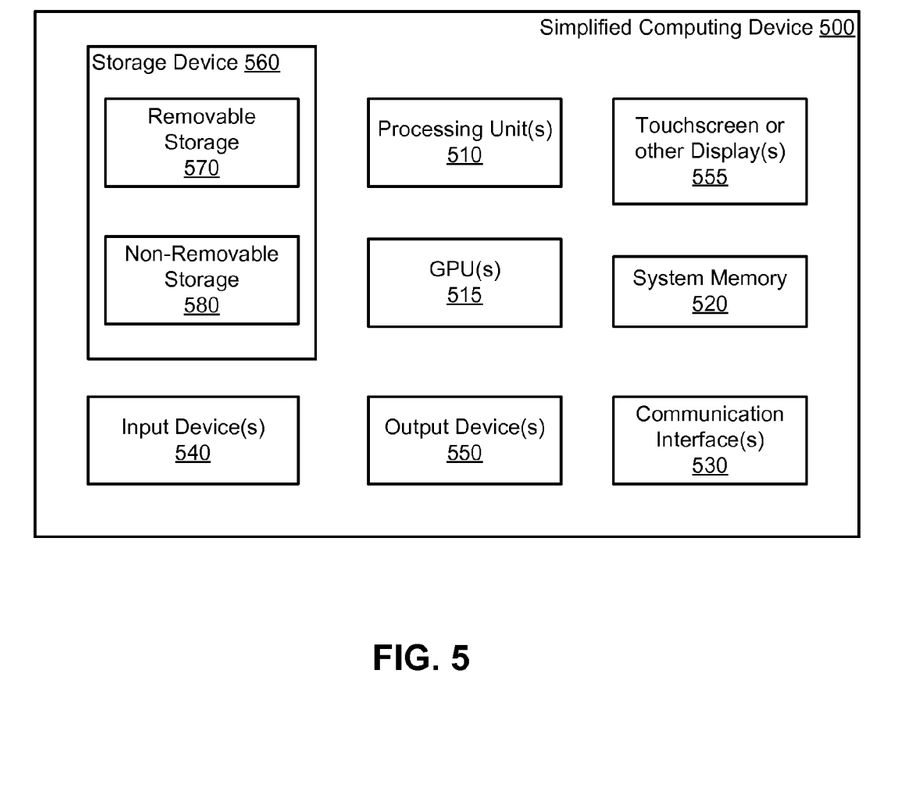
FIG. 5 is a block diagram of a computing environment in accordance with one example for implementation of the disclosed methods and systems or one or more components or aspects thereof.

With reference to FIG. 5, an exemplary computing environment 500 may be used to implement one or more aspects or elements of the above-described methods and/or systems and/or devices. The computing environment 500 may be used by, incorporated into, or correspond with, the electronic device 100 (FIG. 1) or one or more elements thereof. For example, the computing environment 500 may be used to implement one or more elements of the electronic device 100. In some cases, the display system 102 (FIG. 1) may be incorporated into the computing environment 500.

The computing environment 500 may be a general-purpose computer system or graphics- or display-based subsystem used to implement one or more of the acts described in connection with FIG. 4. The computing environment 500 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, audio or video media players, etc.

The computing environment 500 has sufficient computational capability and system memory to enable basic computational operations. In this example, the computing environment 500 includes one or more processing unit(s) 510, which may be individually or collectively referred to herein as a processor. The computing environment 500 may also include one or more graphics processing units (GPUs) 515. The processor 510 and/or the GPU 515 may include integrated memory and/or be in communication with system memory 520. The processor 510 and/or the GPU 515 may be a specialized microprocessor, such as a digital signal processor (DSP), a very long instruction word (VLIW) processor, or other microcontroller, or may be a general purpose central processing unit (CPU) having one or more processing cores. The processor 510, the GPU 515, the system memory 520, and/or any other components of the computing environment 500 may be packaged or otherwise integrated as a system on a chip (SoC), application-specific integrated circuit (ASIC), or other integrated circuit or system.

The computing environment 500 may also include other components, such as, for example, a communications interface 530. One or more computer input devices 540 (e.g., pointing devices, keyboards, audio input devices, video input devices, haptic input devices, devices for receiving wired or wireless data transmissions, etc.) may be provided. The input devices 540 may include one or more touch-sensitive surfaces, such as track pads. Various output devices 550, including touchscreen or touch-sensitive display(s) 555, may also be provided. The output devices 550 may include a variety of different audio output devices, video output devices, and/or devices for transmitting wired or wireless data transmissions.

The computing environment 500 may also include a variety of computer readable media for storage of information such as computer-readable or computer-executable instructions, data structures, program modules, or other data. Computer readable media may be any available media accessible via storage devices 560 and includes both volatile and nonvolatile media, whether in removable storage 570 and/or non-removable storage 580.

Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 500.

The localized backlighting techniques described herein may be implemented in computer-executable instructions, such as program modules, being executed by the computing environment 500. Program modules include routines, programs, objects, components, data structures, etc., that perform particular tasks or implement particular abstract data types. The techniques described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices.

The techniques may be implemented, in part or in whole, as hardware logic circuits or components, which may or may not include a processor. The hardware logic components may be configured as Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and/or other hardware logic circuits.

The technology described herein is operational with numerous other general purpose or special purpose computing system environments or configurations. Examples of well-known computing systems, environments, and/or configurations that may be suitable for use with the technology herein include, but are not limited to, personal computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An electronic device comprising:
   a backlight unit comprising a plurality of planar emission devices distributed over a viewable display area, wherein the plurality of planar emission devices are disposed in a configurable zone arrangement comprising a plurality of zones of the viewable area, each zone of the plurality of zones comprising at least one planar emission device of the plurality of planar emission devices;

a liquid crystal layer disposed adjacent the backlight unit, the liquid crystal layer configured to selectively filter light generated by the plurality of planar emission devices; and a processor coupled to the backlight unit, the processor configured to control a brightness level of the at least one planar emission device in each zone of the plurality of zones separately from other planar emission devices of the plurality of planar emission devices in other zones of the plurality of zones;

wherein the processor is configured to control the brightness level of the at least one planar emission device in a respective zone of the plurality of zones to account for a display defect in the respective zone in the backlight unit or the liquid crystal layer.

2. The electronic device of claim 1, wherein:

each zone of the plurality of zones comprises multiple planar emission devices of the plurality of planar emission devices; and the processor is configured to drive each of the multiple planar emission devices in each zone of the plurality of zones at a common brightness level.

3. The electronic device of claim 1, further comprising a memory in which data indicative of the configurable zone arrangement is stored, wherein the processor is coupled to the memory to access the data to determine the respective brightness level of each planar emission device of the plurality of planar emission devices.

4. The electronic device of claim 1, wherein the processor is configured to process frame data for each zone of the plurality of zones separately from the frame data for other zones of the plurality of zones to determine the brightness level for the respective zone.

5. The electronic device of claim 1, wherein the plurality of planar emission devices are carried on a film.

6. The electronic device of claim 5, wherein the film is bonded to the liquid crystal layer.

7. The electronic device of claim 5, wherein the film is bonded to a support plate.

8. The electronic device of claim 5, wherein each planar emission device of the plurality of planar emission devices comprises a respective organic light emitting diode (OLED) disposed in the film.

9. The electronic device of claim 1, wherein the processor is configured to adjust image tone levels for the liquid crystal layer to coordinate filtering of the light with the brightness level of the at least one planar emission device in each zone of the plurality of zones.

10. The electronic device of claim 1, wherein the processor comprises a low pass filter to smooth the brightness level of the at least one planar emission device in each zone of the plurality of zones based on the brightness levels of other planar emission devices of the plurality of planar emission devices disposed in adjacent zones of the plurality of zones.

11. The electronic device of claim 1, wherein boundaries of the plurality of zones are configurable.

12. The electronic device of claim 1, wherein the number of planar emission devices of the plurality of planar emission devices in each zone of the plurality of zones is configurable.

13. The electronic device of claim 1, wherein the number of zones in the plurality of zones is configurable.

14. The display of claim 1, wherein the processor is configured to process frame data for each zone of the plurality of zones separately from the frame data for other zones of the plurality of zones to determine the brightness level for the respective zone.

15. A display comprising:

a backlight unit comprising a plurality of planar emission devices distributed over a viewable area of the display in a plurality of zones, each zone of the plurality of zones comprising at least one planar emission device of the plurality of planar emission devices; and a liquid crystal layer disposed adjacent the backlight unit, the liquid crystal layer configured to selectively filter light generated by the plurality of planar emission devices;

wherein the liquid crystal layer defines an array of pixels addressable by a processor; and wherein the plurality of zones are disposed in an arrangement having boundaries oriented diagonally relative to an orientation of the array of pixels.

16. The display of claim 15, further comprising a memory coupled to the processor and in which data is stored indicative of a configurable arrangement of the plurality of zones.

17. The display of claim 15, wherein each zone of the plurality of zones comprises multiple planar emission devices of the plurality of planar emission devices.

18. An electronic device comprising:

a backlight unit comprising a plurality of planar emission devices distributed over a viewable display area in a plurality of zones, each zone of the plurality of zones comprising at least one planar emission device of the plurality of planar emission devices;

a liquid crystal layer disposed adjacent the backlight unit, the liquid crystal layer configured to selectively filter light generated by the plurality of planar emission devices; and a processor coupled to the backlight unit, the processor configured to control a brightness level of the at least one planar emission device in each zone of the plurality of zones separately from other planar emission devices of the plurality of planar emission devices in other zones of the plurality of zones;

wherein the processor is configured to process frame data for each zone of the plurality of zones separately from the frame data for the other zones of the plurality of zones to determine the brightness level for the respective zone.

19. The electronic device of claim 18, wherein:

the liquid crystal layer defines an array of pixels addressable by the processor; and the plurality of zones are oriented relative to the array of pixels such that the plurality of zones comprise at least one diamond-shaped zone.

* * * * *